United States Patent
Chen

[11] Patent Number: 6,144,372
[45] Date of Patent: Nov. 7, 2000

[54] SYSTEM EMPLOYING SEMI-CIRCULAR WHEEL FOR ADJUSTABLY ACTUATING ELECTRON PAGE ADVANCEMENT

[75] Inventor: Cheng Hsiung Chen, Taipei, Taiwan

[73] Assignee: Dexin Corporation, Taipei Hsien, Taiwan

[21] Appl. No.: 09/108,216

[22] Filed: Jul. 1, 1998

[51] Int. Cl.[7] .............................. G09G 5/00; G09G 5/08; G09G 5/34
[52] U.S. Cl. ........................... 345/184; 345/163; 345/123
[58] Field of Search ............................ 345/145, 163–168, 345/169, 121, 123, 341; 341/20, 35

[56] References Cited

U.S. PATENT DOCUMENTS

| | | | |
|---|---|---|---|
| 4,159,417 | 6/1979 | Rubincam | 235/375 |
| 5,179,648 | 1/1993 | Hauck | 345/123 |
| 5,313,229 | 5/1994 | Gilligan et al. | 345/163 |
| 5,418,549 | 5/1995 | Anderson et al. | 345/123 |
| 5,530,455 | 6/1996 | Gillick et al. | 345/163 |
| 5,801,713 | 9/1998 | Endo et al. | 345/501 |
| 5,808,568 | 9/1998 | Wu | 341/20 |
| 5,825,353 | 10/1998 | Will | 345/184 |
| 5,912,661 | 6/1999 | Siddiqui | 345/163 |
| 5,917,473 | 6/1999 | Yeh | 345/163 |
| 5,963,195 | 10/1999 | Gregg et al. | 345/163 |
| 5,963,197 | 10/1999 | Bacon et al. | 345/184 |
| 6,014,130 | 1/2000 | Young-Chou | 345/163 |

*Primary Examiner*—Steven J. Saras
*Assistant Examiner*—Paul A. Bell
*Attorney, Agent, or Firm*—Rosenberg, Klein & Lee

[57] ABSTRACT

A page-turning means with adjustable speed comprises a retaining stage, a base plate having switch function, a spring means for providing rebounding force and a semi-circular wheel. The base plate has electronic circuit, connection terminal, and a plurality of elastic plates functioning as switch, and can accommodate the T-shaped spring means. The voltage level change resulting from the on-off state of the switches being sent to external controller through the terminals. The bottom end of the semi-circular wheel is connected to the base plate. The bottom of the semi-circular wheel is in contact to top end of the spring means. When the the semi-circular wheel is rotated by external force, one end portion of the spring means is suppressed to tough one or two elastic plate(s) and voltage of various levels is generated. A controller can output signal to control the page turning speed according to the generated voltage level.

4 Claims, 6 Drawing Sheets

SYSTEM EMPLOYING SEMI-CIRCULAR WHEEL FOR ADJUSTABLY ACTUATING ELECTRON PAGE ADVANCEMENT

FIELD OF THE INVENTION

The present invention relates to a page-turning means with adjustable speed, more particularly, to page-turning means with easy operation and adjustable-speed feature.

BACKGROUND OF THE PRESENT INVENTION

The conventional page-turning operation can be executed by wheel rolling or key pressing, and the advantages and drawbacks of the two methods are discussed as follows:
(1) Wheel-rolling method
Advantage When executing page-up or page-down operation, the user only needs to use finger to touch one point on the rolling wheel and move it forward or backward.
Drawback When executing continuously page-up or page-down operation, the user needs to move his finger to-and-fro continuously, and it is not convenient for user.
(2) Key-pressing method
Advantage The page-turning operation in uni-direction can be performed by simply pressing one finger on page-up or page-down key in keyboard.
Drawback When the direction of page turning is changed, for example, from page-up to page-down and vice versa, the user needs to move his finger backward or forward with a large distance. This may be troublesome for user.

Therefore, the object of the present invention is to provide a page-turning means with adjustable speed, by which the user can turn up or down pages easily and efficiently.

To achieve the object, the present invention provides a page-turning means with adjustable speed, the user only needs to press on an upper portion of a semi-circular wheel and rotates the wheel forward or backward to a specific angle. The pages can be turned forward or backward continuously until the finger releases. During the operation, the finger of the user is kept on a specific point, therefore, the page turning operation is easy and efficient.

The various objects and advantages of the present invention will be more readily understood from the following detailed description when read in conjunction with the appended drawings, in which:

Figure 1:
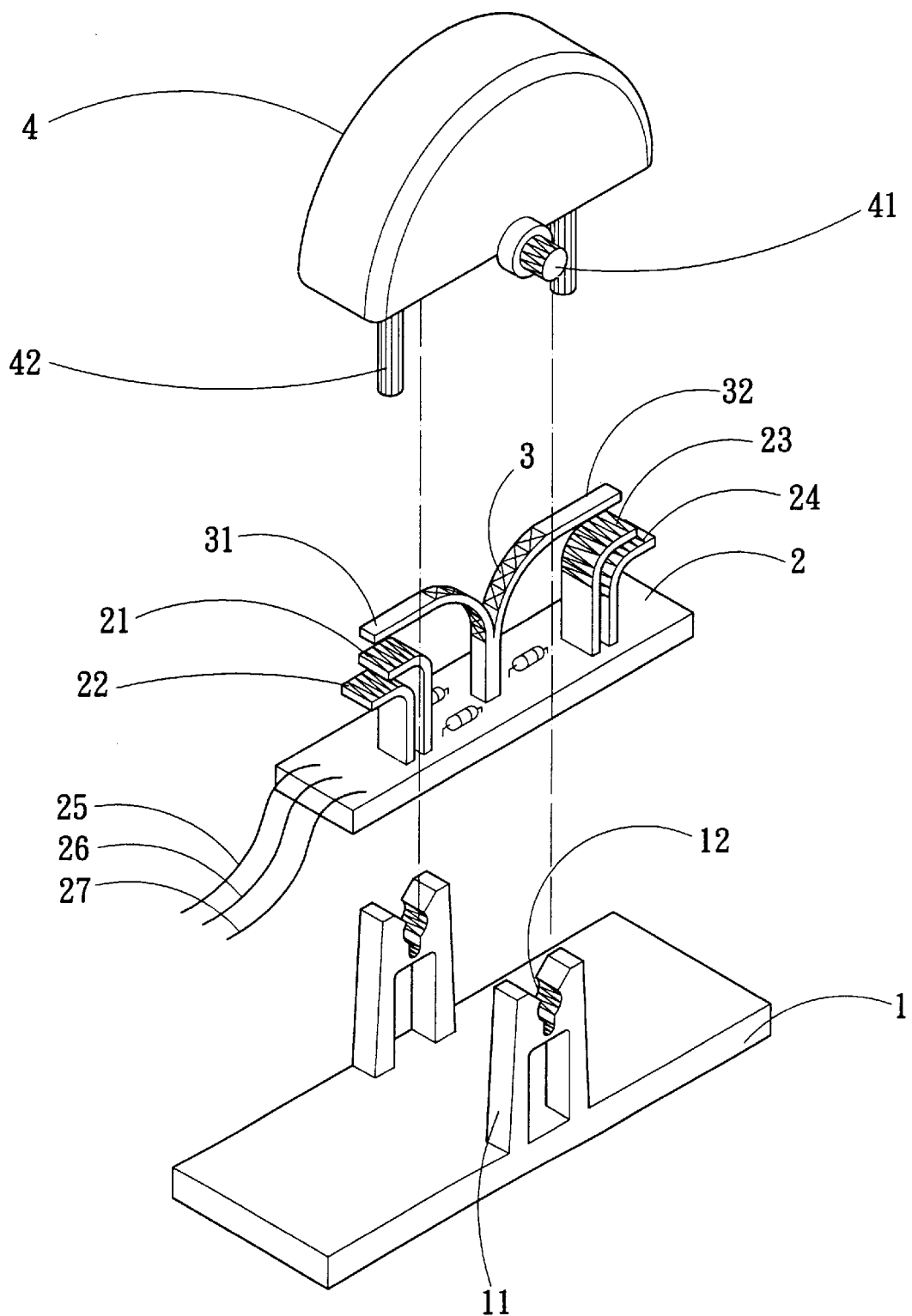
FIG. 1 shows the perspective view of the page-turning means according to the present invention.
Figure 2:
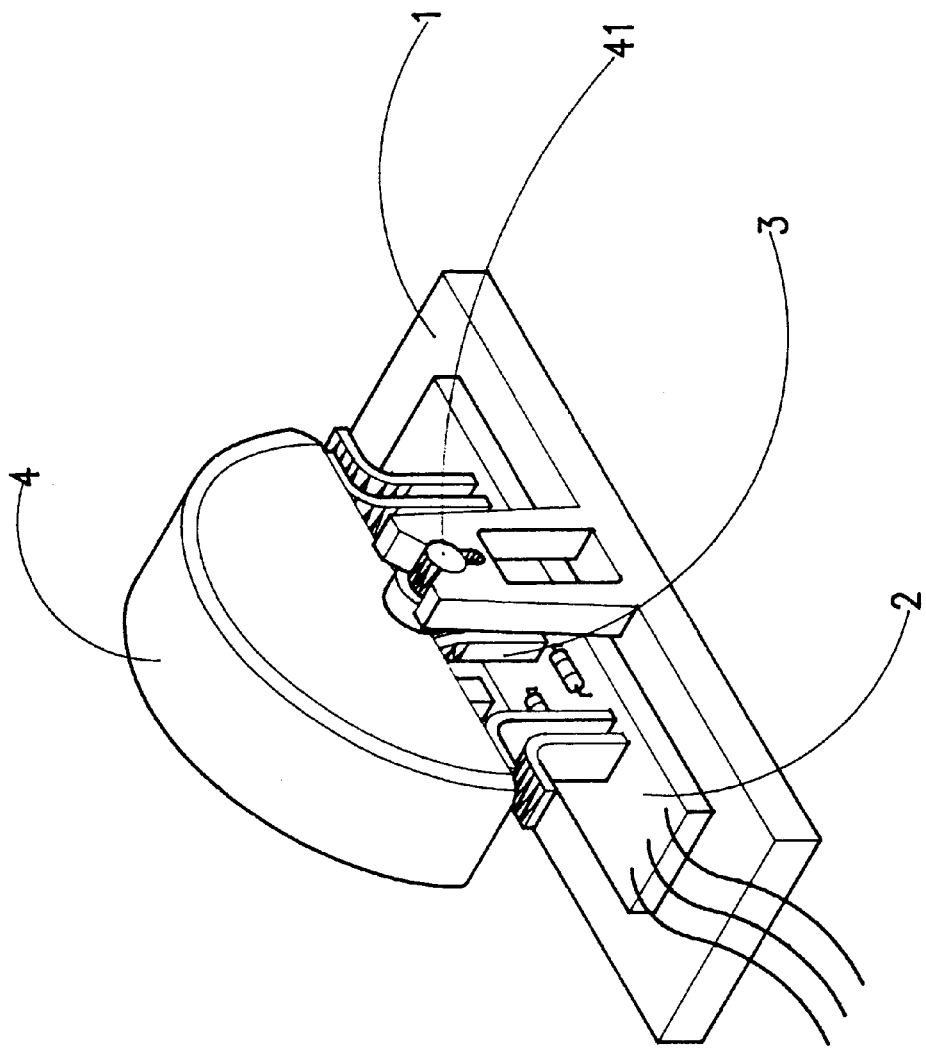
FIG. 2 shows the combinational view of the page-turning means according to the present invention.
Figure 3:
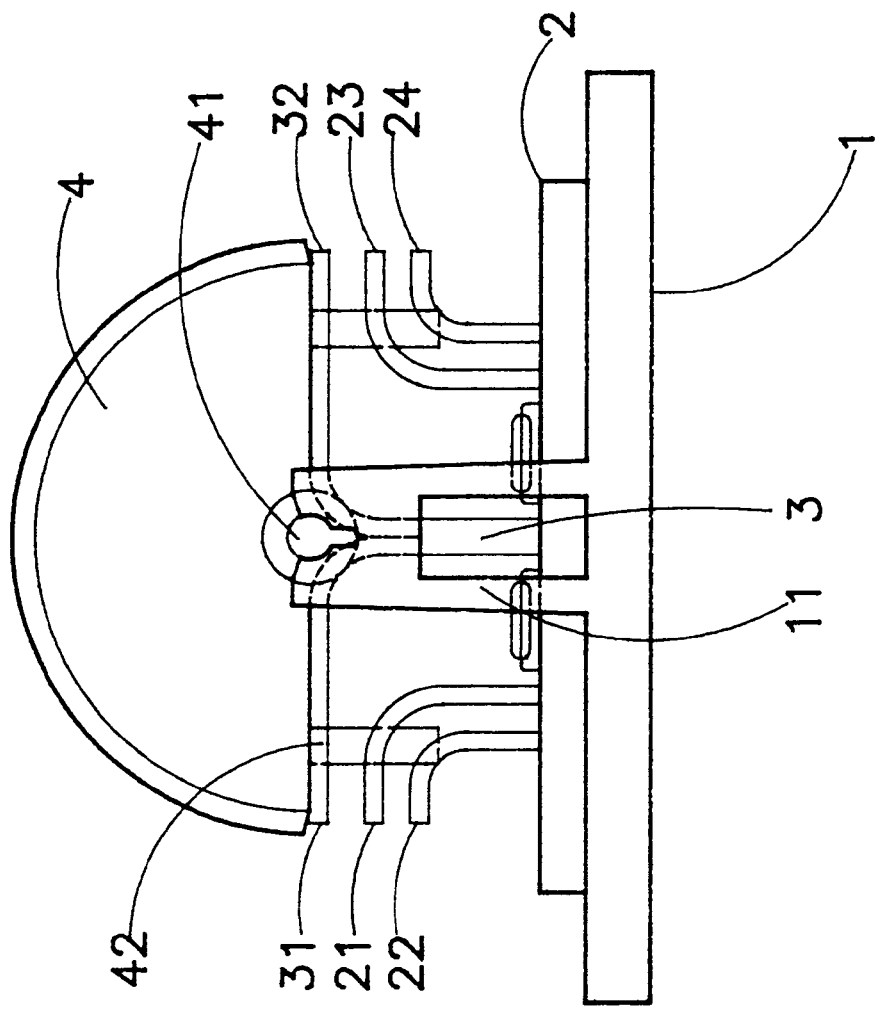
FIG. 3 shows the front view of the page-turning means according to the present invention.

NUMERAL 1 retaining stage
11 supporting pole
12 groove
2 base plate
21–24 elastic plate
25 first contact point
26 second contact point
27 third contact point
3 spring member
31 front portion
32 rear portion
4 semi-circular wheel
41 shaft
42 pressing means
5 control IC
6 main body of mouse
61 axial hole

DETAILED DESCRIPTION OF THE PREFERRED EMBODIMENT

The page-turning means according to the present invention comprises a retaining stage 1, a base plate 2, a spring member 3 for providing a rebounding force, and a semi-circular wheel 4. More particularly, the base plate 2 (printed circuit board) is arranged on the top of the retaining stage 1. Two supporting poles 11 are arranged on both sides of the base plate 2. Each supporting pole 11 has been provided with a groove 12 on top thereof for the engagement of the shaft 41 of the semi-circular wheel 4.

Figure 4:
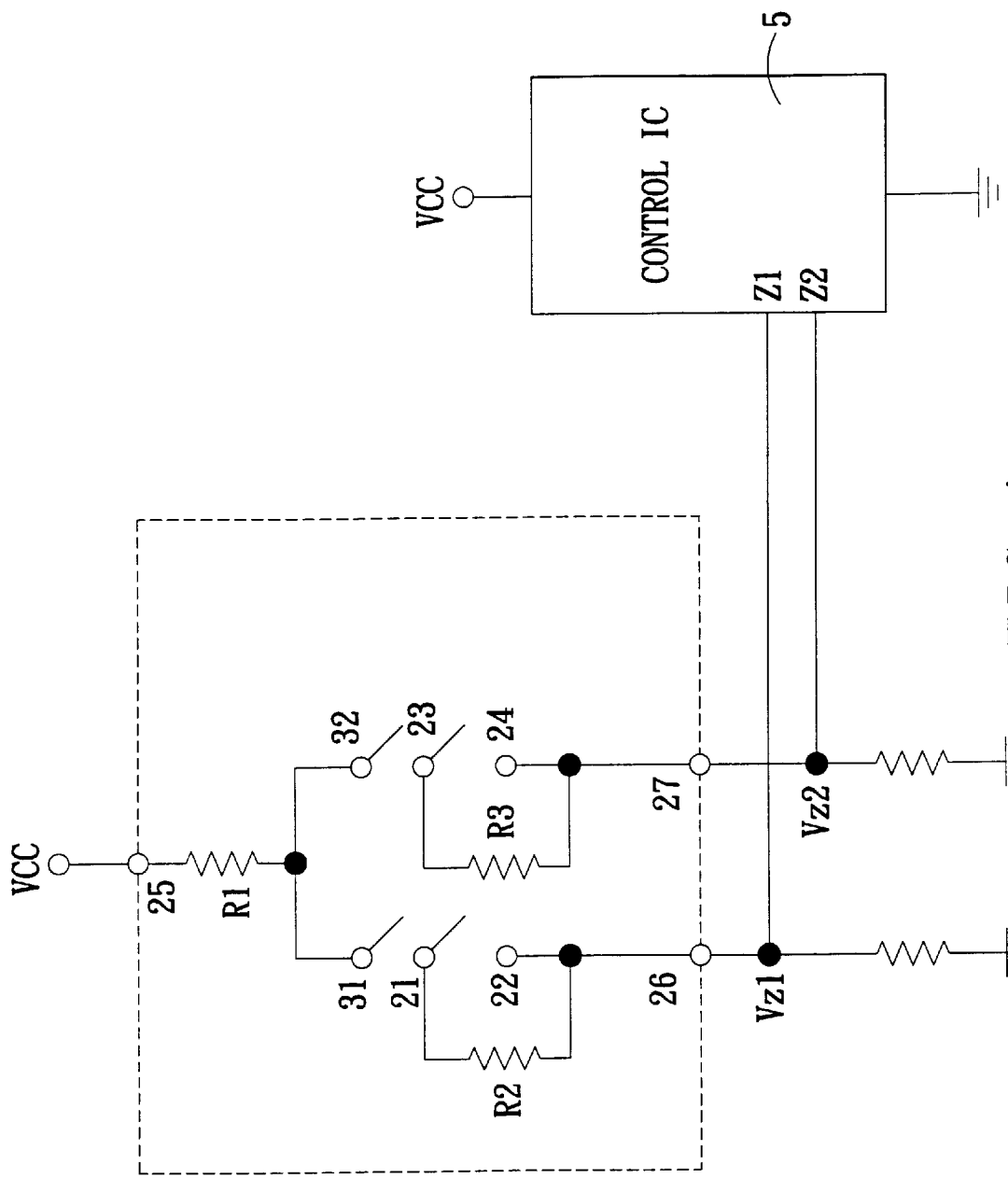
FIG. 4 shows the equivalent circuit of the page-turning means according to the present invention.
Figure 5:
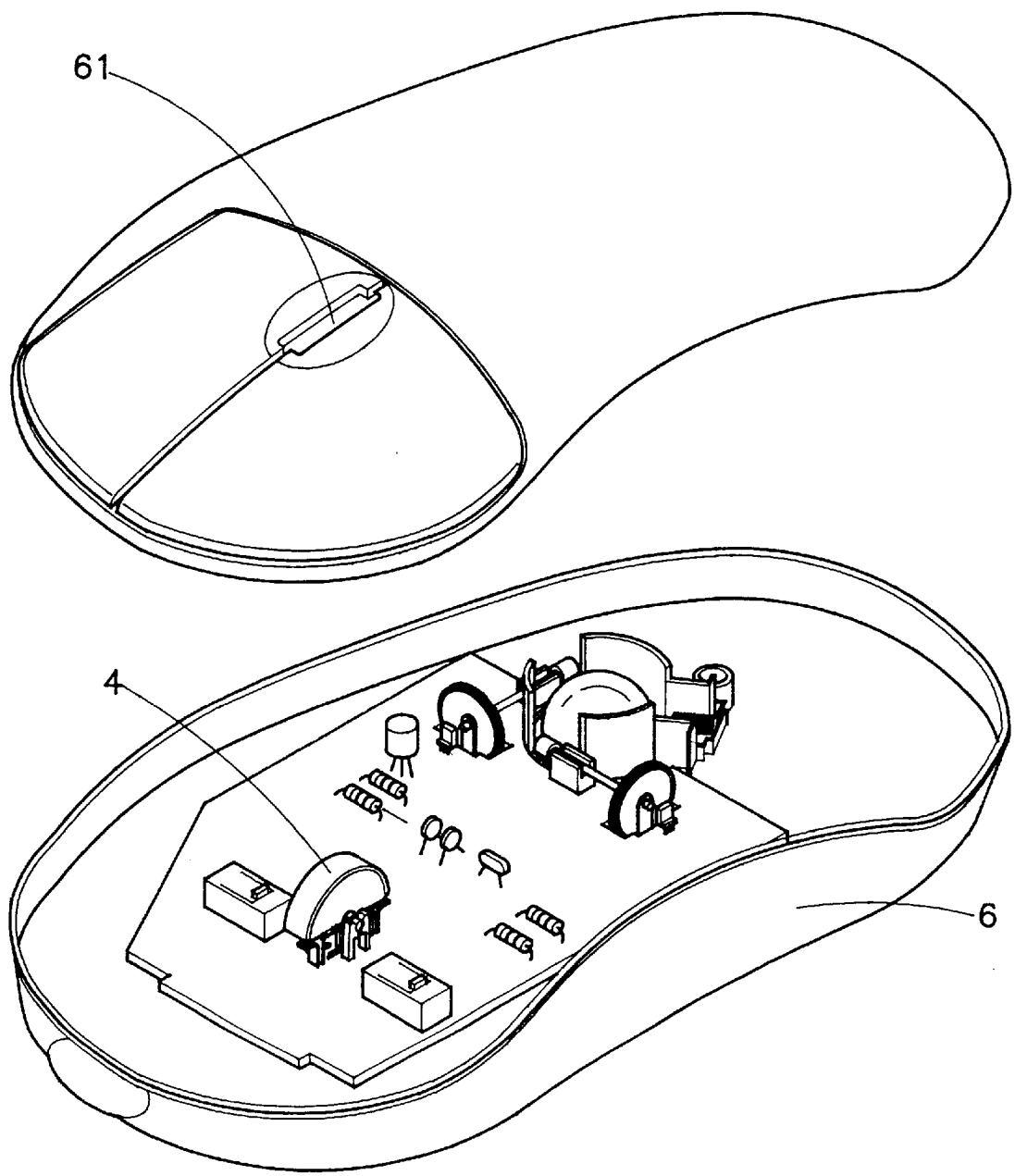
FIG. 5 shows the application of the page-turning means according to the present invention to a mouse.
Figure 6:
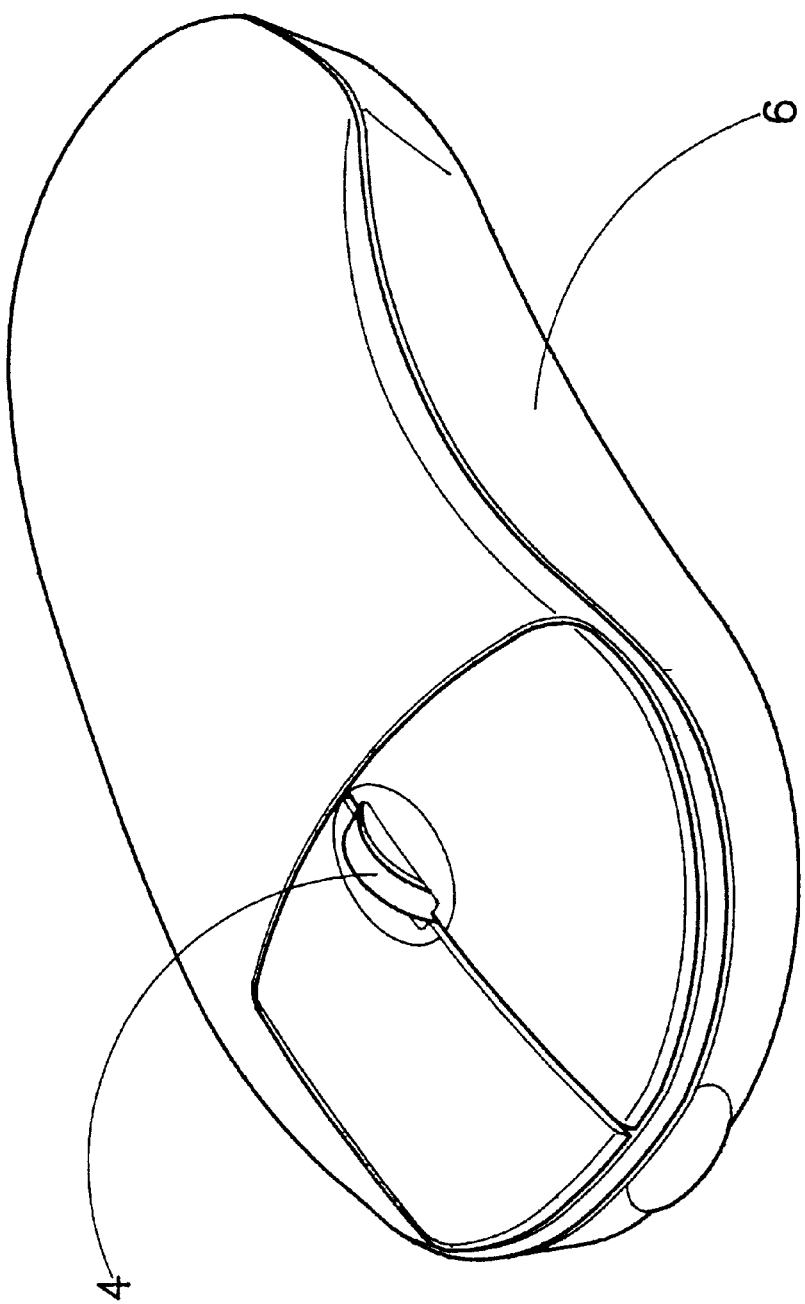
FIG. 6 shows the appearance of mouse equipped with the page-turning means according to the present invention.

The base plate 2 has an electronic circuit comprising resistors R1–R3 and three terminals 25–27, elastic plates 21–24 functioning as switch, and a T-shaped spring member 3. As shown in FIG. 4, the voltage change caused by the switches 21–24 can be sent to the control IC through the terminal 26 (27) of the base plate 2. As shown in FIG. 4, one end of the resistor R1 is connected to power source $V_{cc}$ and first terminal 25, another end thereof is connected to the bottom of the spring member 3. One end of the resistor R2 is connected to the first elastic plate 21 and another end thereof is connected to the second elastic plate 22 and the second terminal 26, One end of the resistor R3 is connected to the third elastic plate 23, and another end thereof is connected to the fourth elastic plate 24 and the third terminal 27.

The bottom portion of the spring member 3 is soldered to the base plate 2 such that two end portions 31, 32 of the spring member 3 are placed on the top of the corresponding elastic plates 21, 23. Therefore, the end portion 31 (32) of the spring member 3 can be in contact with one elastic plate 21 (23) or simultaneously with two elastic plates 21, 22 (23, 24) when being pressed. The top portion of the spring member 3 is in contact with the bottom of the semi-circular wheel 4, such that the spring member 3 can maintain the balance of the semi-circular wheel 4 when no external force is applied, and functions as the contact point of the switch means. Each of the front bottom and rear bottom side of the semi-circular wheel 4 is provided with a limiting means to limit the angle of forward or backward rolling of the semi-circular wheel 4.

When the semi-circular wheel 4 is rotated forward by external force, the front portion 31 of the spring member 3 is forced to approach the elastic plates 21, 22. The front portion 31 of the spring member 3 will be in contact with the elastic plate 21 when the semi-circular wheel 4 is rotated to a first angle. At this time, with reference to FIG. 4, the circuit comprising R1, R2 is closed, therefore, a first voltage VZ1 is sent to a terminal Z1 of IC 5 through terminal 26. If the semi-circular wheel 4 is rotated further, the spring end portion 31 will be in contact simultaneously with the elastic plates 21, 22 and the resistor R2 is bypassed. Therefore, a second voltage VZ2 is fed into a terminal Z2 of IC 5 through terminal 26. The control IC outputs a control signal of different page-turning speed.

Similarly, when the semi-circular wheel 4 is rotated backward, different control voltage VZ2 is fed into IC 5 through terminal 27 to turn down the pages at different speed.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A system for actuating an electronic page advancement controller in adjustable manner comprising:
    (a) a retaining stage having a pair of spaced supporting pole portions projecting therefrom, each said supporting pole portion having formed therein a groove;
    (b) a base plate disposed between said supporting poles of said retaining stage, said base plate including an electronic circuit, at least one connection terminal coupled to the electronic page advancement controller, and a plurality of projecting elastic plate members, said electronic circuit defining a plurality of switchable current paths for respectively generating a set of predetermined signals, each said elastic plate member being coupled to at least one of said current paths;
    (c) a spring member coupled to said base plate resiliently biased to a substantially T-shaped configuration, said spring member having a pair of lateral end portions each extending at least partially over at least one said elastic plate member, each said lateral end portion being deflectable responsive to a deflecting force to couple electrically to at least one said elastic plate member for selectively switching said at least one current path coupled thereto; and,
    (d) a semi-circular wheel member coupled to said supporting poles of said retaining stage, said semi-circular wheel member being angularly displaceable to impart the deflecting force upon said spring member;
    whereby at least one of said predetermined signals is selectively generated for corresponding actuation of the electronic page advancement controller.

2. The system as recited in claim 1 wherein said semi-circular wheel member includes a pair of limiting members extending from distal portions thereof for limiting the angular displacement thereof relative to said base plate.

3. The system as recited in claim 1 wherein said base plate includes at least a pair of said connection terminals coupled to the electronic page advancement controller and at least one auxiliary connection terminal coupled to a power supply.

4. The system as recited in claim 3 wherein said electronic circuit includes:
    (a) a first resistor having a first end coupled to said auxiliary connection terminal and a second end coupled to said spring member;
    (b) a second resistor having a first end coupled to a first of said elastic plate members and a second end coupled to both a second of said elastic plate members and a first of said connection terminals coupled to the electronic page advancement controller; and,
    (c) a third resistor having a first end coupled to a third of said elastic plate members and a second end coupled to both a fourth of said elastic plate members and a second of said connection terminals coupled to the electronic page advancement controller.

\* \* \* \* \*